United States Patent
Chen et al.

(10) Patent No.: US 11,346,975 B2
(45) Date of Patent: May 31, 2022

(54) SPIRAL CT DEVICE AND THREE-DIMENSIONAL IMAGE RECONSTRUCTION METHOD

(71) Applicant: NUCTECH COMPANY LIMITED, Beijing (CN)

(72) Inventors: Zhiqiang Chen, Beijing (CN); Ziran Zhao, Beijing (CN); Yaohong Liu, Beijing (CN); Jianping Gu, Beijing (CN); Qian Yi, Beijing (CN); Bicheng Liu, Beijing (CN); Guangming Xu, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 16/467,140

(22) PCT Filed: Aug. 4, 2017

(86) PCT No.: PCT/CN2017/096017
§ 371 (c)(1),
(2) Date: Jun. 6, 2019

(87) PCT Pub. No.: WO2018/103355
PCT Pub. Date: Jun. 14, 2018

(65) Prior Publication Data
US 2019/0317240 A1   Oct. 17, 2019

(30) Foreign Application Priority Data

Dec. 7, 2016  (CN) .......................... 201611117356.9

(51) Int. Cl.
*G01V 5/00* (2006.01)
*G01N 23/046* (2018.01)
*G01T 1/29* (2006.01)

(52) U.S. Cl.
CPC .......... *G01V 5/005* (2013.01); *G01N 23/046* (2013.01); *G01N 2223/419* (2013.01); *G01T 1/2914* (2013.01); *G01V 5/0041* (2013.01)

(58) Field of Classification Search
CPC ............ G01N 2223/419; G01N 23/046; G01T 1/2914; G01T 1/2985; G01V 5/0041;
(Continued)

(56) References Cited

U.S. PATENT DOCUMENTS 6,760,399 B2 *  7/2004  Malamud ............. A61B 6/4028
378/4
6,813,374 B1 *  11/2004  Karimi ................. G01V 5/0008
378/207
(Continued)

FOREIGN PATENT DOCUMENTS

CN   1433282 A   7/2003
CN   1751661 A   3/2006
(Continued)

OTHER PUBLICATIONS

International Search Report and Written Opinion of the International Searching Authority for International Patent Application No. PCT/CN2017/096017 dated Oct. 18, 2017, 17 pages, English translation.
(Continued)

*Primary Examiner* — Dani Fox
*Assistant Examiner* — Soorena Kefayati
(74) *Attorney, Agent, or Firm* — Merchant & Gould P.C.

(57) ABSTRACT

The present disclosure provides a spiral Computed Tomography (CT) device and a three-dimensional image reconstruction method. The spiral CT device includes: an inspection station operable to carry an object to be inspected and defining an inspection space; a rotational supporting apparatus disposed around the inspection space; a plurality of
(Continued)

X-ray sources located on the rotational supporting apparatus; and a plurality of X-ray receiving apparatuses located on the rotational supporting apparatus and opposing to the plurality of X-ray sources respectively, wherein the plurality of X-ray sources and the plurality of X-ray receiving apparatuses are rotational synchronously with the rotational supporting apparatus, wherein the plurality of X-ray sources are closely disposed and fan-shaped X-ray beams provided by the plurality of X-ray sources cover the inspection space with a minimum degree of overlapping.

18 Claims, 3 Drawing Sheets

(58) Field of Classification Search
CPC ...... G01V 5/005; G01V 5/0016; G01V 5/025; G01V 5/0066; G01V 5/0033; G01V 5/0008; A61B 6/027; A61B 6/4014; A61B 6/4007

See application file for complete search history.

(56) References Cited

U.S. PATENT DOCUMENTS

| | | | | |
|---|---|---|---|---|
| 7,388,941 B2* | 6/2008 | Sukovic | ............ | A61B 6/032 378/197 |
| 7,420,174 B2* | 9/2008 | Kurita | ............ | G01V 5/0016 378/57 |
| 7,428,292 B2* | 9/2008 | De Man | ............ | A61B 6/4028 378/4 |
| 7,672,422 B2* | 3/2010 | Seppi | ............ | G01V 5/005 378/114 |
| 7,684,538 B2* | 3/2010 | Morton | ............ | A61B 6/027 378/10 |
| 7,869,561 B2* | 1/2011 | Dafni | ............ | H05G 1/70 378/19 |
| 8,139,709 B2* | 3/2012 | Noo | ............ | A61B 6/583 378/19 |
| 8,837,669 B2* | 9/2014 | Morton | ............ | A61B 6/027 378/41 |
| 9,277,893 B2* | 3/2016 | Tsukagoshi | ............ | A61B 6/032 |
| 2003/0108146 A1* | 6/2003 | Malamud | ............ | A61B 6/4028 378/19 |
| 2005/0117700 A1* | 6/2005 | Peschmann | ............ | G01V 5/00 378/57 |
| 2005/0190878 A1* | 9/2005 | De Man | ............ | A61B 6/4028 378/9 |
| 2005/0276376 A1* | 12/2005 | Eilbert | ............ | A61B 6/4241 378/57 |
| 2006/0285633 A1* | 12/2006 | Sukovic | ............ | A61B 6/4007 378/9 |
| 2007/0230657 A1* | 10/2007 | Garms | ............ | G01V 5/005 378/57 |
| 2008/0019474 A1* | 1/2008 | Nakanishi | ............ | A61B 6/541 378/9 |
| 2008/0123804 A1* | 5/2008 | De Man | ............ | A61B 6/032 378/9 |
| 2009/0022264 A1* | 1/2009 | Zhou | ............ | A61B 6/025 378/5 |
| 2009/0086888 A1* | 4/2009 | Hagiwara | ............ | G06T 11/006 378/20 |
| 2009/0161816 A1* | 6/2009 | De Man | ............ | A61B 6/4028 378/92 |
| 2010/0080337 A1* | 4/2010 | Seppi | ............ | G21K 1/10 378/5 |
| 2010/0183215 A1* | 7/2010 | Sakai | ............ | A61B 6/5241 382/132 |
| 2010/0303287 A1* | 12/2010 | Morton | ............ | H01J 35/045 382/100 |
| 2010/0322498 A1* | 12/2010 | Wieczorek | ............ | A61B 6/4028 382/131 |
| 2011/0142201 A1* | 6/2011 | Eberhard | ............ | G01V 5/0008 378/57 |
| 2011/0150174 A1* | 6/2011 | Sainath | ............ | A61B 6/4429 378/9 |
| 2011/0211666 A1* | 9/2011 | Ying | ............ | A61B 6/482 977/950 |
| 2011/0282181 A1* | 11/2011 | Wang | ............ | A61B 5/0095 600/407 |
| 2012/0301004 A1* | 11/2012 | Kingston | ............ | G01N 23/046 382/131 |
| 2013/0022165 A1* | 1/2013 | Jang | ............ | A61B 6/027 378/19 |
| 2013/0156156 A1* | 6/2013 | Roe | ............ | G01N 23/02 378/57 |
| 2013/0235971 A1* | 9/2013 | Oreper | ............ | G01T 1/2985 378/57 |
| 2013/0251111 A1* | 9/2013 | Eichenseer | ............ | G01T 7/005 378/207 |
| 2014/0010343 A1* | 1/2014 | Basu | ............ | G01V 5/005 378/19 |
| 2014/0185738 A1* | 7/2014 | Lee | ............ | A61B 6/5205 378/4 |
| 2014/0185742 A1* | 7/2014 | Chen | ............ | G06T 7/11 378/4 |
| 2014/0294147 A1* | 10/2014 | Chen | ............ | G01V 5/0066 378/57 |
| 2015/0146848 A1* | 5/2015 | Gupta | ............ | G01V 5/0016 378/57 |
| 2015/0185355 A1* | 7/2015 | Zhang | ............ | G01N 23/046 378/20 |
| 2015/0185357 A1* | 7/2015 | Chen | ............ | G01T 1/2985 378/5 |
| 2015/0199804 A1* | 7/2015 | Chen | ............ | G01V 5/005 382/141 |
| 2015/0325010 A1* | 11/2015 | Bedford | ............ | G01V 5/0016 378/57 |
| 2015/0351705 A1* | 12/2015 | Brady | ............ | A61B 6/032 378/20 |
| 2016/0170075 A1* | 6/2016 | Schafer | ............ | G01V 5/005 378/57 |
| 2016/0252647 A1* | 9/2016 | Awad | ............ | H04N 13/122 348/48 |
| 2016/0334535 A1* | 11/2016 | Dreiseitel | ............ | G01V 5/005 |
| 2016/0356915 A1* | 12/2016 | Green | ............ | G01V 5/0016 |
| 2017/0108453 A1* | 4/2017 | Foland | ............ | G01N 23/046 |
| 2017/0131428 A1* | 5/2017 | Langeveld | ............ | G01V 5/0041 |
| 2018/0038807 A1* | 2/2018 | Hauser | ............ | A61B 6/4405 |
| 2019/0209107 A1* | 7/2019 | Vogtmeier | ............ | A61B 6/4007 |

FOREIGN PATENT DOCUMENTS

| | | |
|---|---|---|
| CN | 102697517 A | 10/2012 |
| CN | 106526686 A | 3/2017 |
| CN | 206515487 U | 9/2017 |
| DE | 10 2009 057 716 A1 | 6/2011 |
| JP | 2013022455 A | 2/2013 |

OTHER PUBLICATIONS

Extended European Search Report for corresponding European Patent Application No. 17879490.5 dated Jul. 9, 2020, 6 pages.

* cited by examiner

SPIRAL CT DEVICE AND THREE-DIMENSIONAL IMAGE RECONSTRUCTION METHOD

CROSS-REFERENCE TO RELATED APPLICATION(S)

This application is a National Stage Application of PCT/CN2017/096017, filed on Aug. 4, 2017, which claims benefit of Chinese Patent Application No. 201611117356.9, filed on Dec. 7, 2016, which are incorporated herein by reference in their entireties. A claim of priority is made to each of the above disclosed applications.

TECHNICAL FIELD

The present disclosure relates to the field of radiation imaging, and more particularly, to a spiral Computed Tomography (CT) device and a three-dimensional image reconstruction method.

BACKGROUND

With the development of the world economy and international trade, transportation of containers has been more and more widely applied in various countries' economies. At the same time, security inspection of the containers has also become more important. Especially after the "911" incident in 2001, countries around the world have strengthened security inspection against terrorist attacks, drug trafficking, smuggling, etc., and have enhanced inspection standards. Among the several common inspection methods in the field of security inspection, X-ray transmission technology has advantages such as strong penetration ability, short measurement time and high resolution, and therefore is often used for inspection of cargos in containers in airports, customs etc. However, with the improvement of social needs and the development of technology, CT technology has also been introduced into the field of social public security from initial medical diagnosis and industrial non-destructive testing.

After the development for many years, the CT technology has gradually evolved from scanning using a thin X-ray beam, a small fan beam, or a large fan beam to scanning using spiral CT. The difference from the initial normal CT technology is in that, during scanning with the spiral CT, both a scanning bracket and an object to be detected are continuously moved, an X-ray source is spirally rotated relative to the object, and detectors continuously collect projection data, so as to obtain a three-dimensional image of the object to be detected, which may greatly shorten time for scanning. In addition, a resolution capability of the CT technology itself for densities and atomic numbers may further improve effects of material recognition during inspection.

In 1991, the Elscint company firstly introduced dual-slice spiral CT technology. Then, other companies have also developed multi-slice spiral CT technology. In this multi-slice spiral CT technology, a structure of multiple rows of detectors is used to obtain projection data in multiple slices simultaneously during scanning in a circle, thereby increasing a detection area, obtaining a high-quality three-dimensional reconstructed image, and also improving the scanning efficiency of the system. The conventional multi-slice spiral CT has been widely used in the medical field etc., but cannot be well applied to inspection of large objects such as air containers etc. Specifically, in consideration of inconsistency among dosages of fan-shaped X-ray beams, fan angles of the X-ray beams must be kept below a certain upper limit value. Therefore, in a case where a volume of a large object such as an air container etc. is much greater than that of an object to be detected in the medial field, a larger inspection space is required by the same multi-slice spiral CT device in order to realize detection of the air container. In addition, a penetration power of an X-ray source is also a factor which must be considered, and complex structures of the X-ray source and detectors as well as stability problems caused by load-carrying also cannot be ignored.

Therefore, there is a need for a spiral CT device capable of performing inspection of a large object with good performance.

SUMMARY

In order to solve the above problems existing in the conventional art, the present disclosure proposes a spiral CT device and a three-dimensional image reconstruction method.

According to an aspect of the present disclosure, there is proposed a spiral CT device. The spiral CT device comprises: an inspection station configured to carry an object to be inspected, the inspection station defining an inspection space which is located above the inspection station and is used for accommodating the object to be inspected; a rotational supporting apparatus which is disposed around the inspection space in a plane parallel to a first direction and is rotatable around the inspection space in a detection state; a plurality of X-ray sources located on the rotational supporting apparatus and configured to transmit X-rays to pass through the inspection space; and a plurality of X-ray receiving apparatuses in one-to-one correspondence to the plurality of X-ray sources, the plurality of X-ray receiving apparatuses being located on the rotational supporting apparatus opposite to the plurality of X-ray sources respectively and configured to collect the X-rays passing through the inspection space, wherein the plurality of X-ray sources and the plurality of X-ray receiving apparatuses are rotational synchronously with the rotational supporting apparatus.

In one embodiment, the inspection station is movable in the first direction and/or in a direction perpendicular to the first direction.

In one embodiment, the first direction is a vertical direction.

In one embodiment, the rotation supporting apparatus is a slip ring, the plurality of X-ray sources and the plurality of X-ray receiving apparatuses are disposed on a circumference of the slip ring, and one of the X-ray sources and a corresponding one of the X-ray receiving apparatuses are located on opposite sides of the circumference with respect to a center thereof.

In one embodiment, in the detection state, a center of the circumference of the slip ring coincides with a center of the inspection space.

In one embodiment, the rotational supporting apparatus is a bracket.

In one embodiment, the X-ray sources are X-ray accelerators.

In one embodiment, the X-ray sources provide fan-shaped X-ray beams.

In one embodiment, the plurality of X-ray sources are closely disposed on the rotational supporting apparatus, and the fan-shaped X-ray beams provided by the plurality of X-ray sources cover the inspection space with a minimum degree of overlapping.

In one embodiment, the X-ray receiving apparatuses each comprise a plurality of rows of detectors.

In one embodiment, the spiral CT device further comprises a processor. The processor is connected to the plurality of X-ray receiving apparatuses and configured to process the collected X-rays and reconstruct a three-dimensional image of the object to be inspected, wherein the three-dimensional image is reconstructed by the processor using a linear interpolation method.

In one embodiment, when two adjacent ones of the plurality of X-ray receiving apparatuses have an overlapped coverage, data in the overlapping region is processed using a compressive sensing technique.

According to another aspect of the present disclosure, there is further proposed a method for reconstructing a three-dimensional image from projection data obtained by a CT device. The CT device having a plurality of pairs of X-ray sources and X-ray receiving apparatuses. The method comprises: obtaining projection data by each pair of X-ray source and X-ray receiving apparatus among the plurality of pairs of X-ray sources and X-ray receiving apparatuses; interpolating the projection data obtained by each pair of X-ray source and X-ray receiving apparatus; and reconstructing the three-dimensional image based on the interpolated projection data using image reconstruction algorithms, wherein in the step of reconstructing the three-dimensional image using image reconstruction algorithms, for two pairs of X-ray sources and X-ray receiving apparatuses having an overlapped projection portion, an image reconstruction algorithm for data corresponding to the overlapped projection portion in the interpolated projection data obtained using the two pairs of X-ray sources and X-ray receiving apparatuses is different from an image reconstruction algorithm for data corresponding to remaining portions except for the overlapped projection portion in the interpolated projection data.

In one embodiment, the CT device is the spiral CT device described above.

In one embodiment, the interpolation step is implemented using a linear interpolation method.

In one embodiment, the data corresponding to the overlapped projection portion in the interpolated projection data obtained using the two pairs of X-ray sources and X-ray receiving apparatuses is processed using a compressive sensing technique.

With the spiral CT device and the three-dimensional image reconstruction method according to the present disclosure, large objects may be inspected while ensuring a small system size, a short inspection time, and a high inspection quality. Thereby, the problems in the conventional techniques described above are solved, thereby satisfying the needs of airports for inspection of large cargos.

DETAILED DESCRIPTION

The specific embodiments of the present disclosure will be described in detail below. It should be noted that the embodiments herein are used for illustration only, without limiting the present disclosure. In the description below, a number of specific details are explained to provide better understanding of the present disclosure. However, it is apparent to those skilled in the art that the present disclosure can be implemented without these specific details. In other instances, well known circuits, materials or methods are not described specifically so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the accompanying drawings are provided here for the purpose of illustration, and are not necessarily drawn to scale. The term "and/or" used herein means any and all combinations of one or more listed items.

The present disclosure will be described in detail below with reference to the accompanying drawings.

Figure 1:
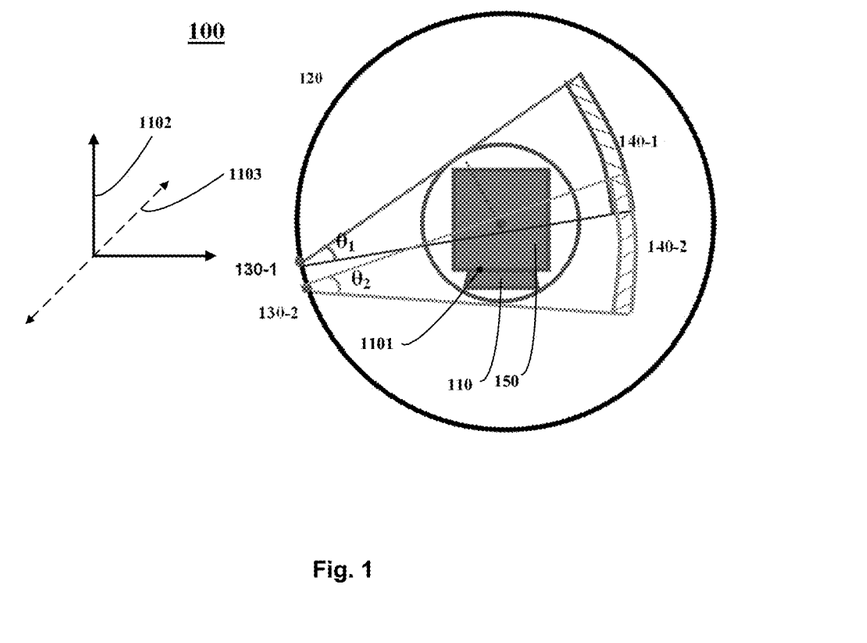
FIG. 1 illustrates a structural diagram of a spiral CT device according to an embodiment of the present disclosure.

Firstly, FIG. 1 illustrates a structural diagram of a spiral CT device 100 according to an embodiment of the present disclosure. As shown, the spiral CT device 100 illustrated comprises an inspection station 110, a rotational supporting apparatus 120, two X-ray sources 130-1 and 130-2 (collectively referred to as 130 hereinafter), and two X-ray receiving apparatuses 140-1 and 140-2 (collectively referred to as 140 hereinafter). It is to be illustrated that, for convenience of description, only two X-ray sources 130 and two X-ray receiving apparatuses 140 are exemplarily shown in FIG. 1. It should be understood that in other embodiments of the present disclosure, more or less X-ray sources 130 and X-ray receiving apparatuses 140 may be included.

The inspection station 110 is configured to carry an object to be inspected on a carrying surface 1101 thereof. The inspection station 110 defines an inspection space which is located above the inspection station and is used for accommodating the object to be inspected. In one embodiment, the inspection space 150 may be physically defined by a physical component (for example, a wall panel built on the inspection station 110) or defined by other technical means (for example, infrared detection) in an auxiliary manner. Alternatively, the inspection space 150 may also be defined without any physical components, but instead it is agreed that there is a space of a particular size above the inspection station 110.

In one embodiment, the inspection station 110 is movable in a first direction and/or in a direction perpendicular to the first direction. The movement in the first direction makes it convenient to place the object to be inspected. For example, the inspection station 110 is firstly brought down to a suitable height, and after the object to be inspected is placed on the inspection station 110, the inspection station 110 is raised to a height suitable for CT measurement. The movement in the direction perpendicular to the first direction makes it convenient to perform the spiral CT inspection, and a speed of the horizontal movement may be determined by a rotation period and a measurement length.

In one embodiment, the first direction is a vertical direction (as shown in FIG. 1). A normal direction 1102 for the carrying surface 1101 is a first direction (1102). The inspection station 110 is operable to move along a second direction 1103 perpendicular to the first direction 1102 to cause the object to be inspected to pass through the inspection space 150.

In a detection state, the inspection station 110 is rotatable in the direction (as indicated by the horizontal direction in FIG. 1) perpendicular to the first direction, so that the inspection station 110 cooperatively rotates with the rotational supporting apparatus 120 described below to realize helical scanning of the object to be inspected.

The rotational supporting apparatus 120 is shown as a ring in FIG. 1. It may be seen that the rotational supporting apparatus 120 is shown as a slip ring in FIG. 1. However, it should be understood that in other embodiments of the present disclosure, the rotational supporting apparatus 120 may also be implemented by other structures, such as a bracket. In the detection state, the rotational supporting apparatus 120 is disposed around the inspection space 150 in a plane parallel to the first direction, and is rotatable around the inspection space 150.

The X-ray sources 130 are located on the rotational supporting apparatus 120 and are configured to transmit X-rays to pass through the inspection space 150.

In one embodiment, the X-ray sources 130 are X-ray accelerators for providing high-energy X-ray beams.

In one embodiment, the X-ray sources 130 provide fan-shaped X-ray beams.

In one embodiment, the X-ray sources 130-1 and 130-2 are closely disposed on the rotational supporting apparatus, and the fan-shaped X-ray beams provided by the X-ray sources cover the inspection space 150 with a minimal degree of overlapping. In this way, a size of the system may be better reduced.

A case where the two X-ray sources 130-1 and 130-2 are closely disposed is exemplarily shown in FIG. 1. A distance SO from a target point of one of the X-ray source(s) 130 to a central point of the inspection space 150 (i.e., a rotational radius of the target point of the X-ray source 130) is:

$$SO = R/\sin(n\theta/2)$$

where R is a radius of a circular region shown in FIG. 1, θ is a fan angle of an X-ray beam of the X-ray source 130, and n is a number of the X-ray source(s) 130 used. By taking $\theta = \theta_{max} = 45°$ as an example, when a single X-ray source 130 is used, $SO_{1S} = R/\sin(22.5°)$; and when two X-ray sources 130 which are closely disposed are used under the same conditions, $SO_{2S} = R/\sin(45°)$. Thus, $SO_{1S}/SO_{2S} = 1.848$, that is, the rotational radius of the target point when two X-ray sources 130 are used is 1/1.848 times the rotational radius of the target point in a case where a single X-ray source 130 is used. Therefore, when a plurality of X-ray sources are used, the rotational radius SO of the target point of each of the X-ray sources is effectively decreased, thereby reducing the size of the system.

In order to ensure that the system collects a sufficient amount of data and the inspection system is simplified to reduce a cost thereof, the X-ray sources 130 should have a high beam emission frequency. This is because in consideration of the influence of an amount of collected projection data on under-determination of a reconstruction algorithm, in order to avoid the under-determination, the amount of projection data should be not lower than a number of imaging pixels, that is, during scanning (by taking detectors being the receiving apparatuses as an example), a total number of beam emissions from the X-ray sources×a total number of multiple rows of detector crystals≥a number of pixels in a three-dimensional image.

That is, in a case of a reconstructed image with fixed pixels, in order to increase the amount of projection data, a high beam emission frequency of the X-ray sources or a large total number of detector crystals may be used. However, no matter whether to increase a number of detector crystals in each single row or increase a number of the rows of the detectors, it may bring a large burden to the design, manufacturing, operation, maintenance and cost etc. of the system. Therefore, it is preferred to increase the beam emission frequency of the X-ray sources.

The X-ray receiving apparatuses 140 are in one-to-one correspondence to the plurality of X-ray sources 130. The X-ray receiving apparatuses 140 are located on the rotational supporting apparatus 120 opposite to the plurality of X-ray sources 130 respectively and are configured to collect the X-rays passing through the inspection space 150.

In one embodiment, the X-ray receiving apparatuses 140 each comprise a plurality of rows of detectors. Image data in multiple slices may be obtained at the same time through exposure of the X-ray sources at a time, which may increase a detection area, reduce the collection time, and improve the inspection efficiency. Each of the X-ray sources 130 corresponds to a group of multiple rows of detectors. Numbers and dimensions of detectors in various groups may be the same or different, and correspond to their respective data collection channels.

In a case where the X-ray sources 130 are closely disposed, the X-ray receiving apparatuses 140 may overlap, and at this time, adjacent ones of the X-ray receiving apparatuses 140 are required to be slightly separated in a radial direction to enable overlapping.

The X-ray sources 130 and the plurality of X-ray receiving apparatuses 140 are rotatable synchronously with the rotational supporting apparatus 120.

In FIG. 1, the rotational supporting apparatus 120 is a slip ring, the X-ray sources 130 and the X-ray receiving apparatuses 140 are disposed on a circumference of the slip ring, and one (for example, the X-ray source 130-1) of the X-ray sources 130 and a corresponding one (for example, the X-ray receiving apparatus 140-1) of the X-ray receiving apparatuses 140 are located on opposite sides of the circumference with respect to a center thereof.

In one embodiment, in the detection state, the center of the circumference of the slip ring coincides with the center of the inspection space 150.

In one embodiment, the spiral CT device 100 further comprises a processor (not shown). Preferably, the processor is connected to the X-ray receiving apparatuses 140 and is configured to process the collected X-rays and reconstruct a three-dimensional image of the object to be inspected. Here, the processor reconstructs the three-dimensional image using a linear interpolation method.

Specifically, for spiral CT scanning, since projection data in a slice depending on any of scanning axes is incomplete, if reconstruction is performed directly, it may result in volume artifacts. Therefore, Z-axis (for example, a direction in which the inspection station horizontally moves) interpolation, for example, a 180-degree or 360-degree linear interpolation method, needs to be used. By taking the most commonly-used 180-degree linear interpolation method as an example, assuming that an interpolation position is $Z_{img}$, a data collection position is $Z(\alpha)$, and a position from the sampling point by 180° is $Z(\alpha+\pi)$, then projection data obtained after the 180-degree linear interpolation is:

$$p_{img}(n,m) = \omega_1 p(n,m) + \omega_2 p(n+N_{p,\pi},m)$$

where p(n,m) is data collected by an $m^{th}$ detector crystal at an $n^{th}$ projection angle, and $p(n+N_{p,\pi},m)$ is projection data from p(n,m) by 180°. Interpolation coefficients $\omega_1$ and $\omega_2$ are as follows respectively:

$$\omega_1 = \frac{Z(\alpha+\pi) - Z_{img}}{Z(\alpha+\pi) - Z(\alpha)}$$

$$\omega_2 = \frac{Z_{img} - Z(\alpha)}{Z(\alpha+\pi) - Z(\alpha)}$$

After linear interpolation of the projection data, a three-dimensional image is reconstructed using an image reconstruction algorithm, for example, reconstruction methods such as the Filtered Back Projection (FBP) reconstruction method, or the iterative Ordered Subset maximum Expectation Method (OSEM) or the Algebraic Reconstruction Technique (ART) in combination with the FBP algorithm etc.

In one embodiment, when two adjacent ones (for example, the X-ray receiving apparatuses 140-1 and 140-2 in FIG. 1) of the X-ray receiving apparatuses 140 have an overlapped coverage, data in the overlapping region is processed using a compressive sensing technique.

Specifically, by taking the case shown in FIG. 1 as an example, if a plurality of rows of detectors are used as the X-ray receiving apparatuses 140, since the X-ray sources 130 have a certain size, two target points may not completely coincide. In order to completely cover the object to be inspected with the rays, it may inevitably enable partial overlapping of the X-ray receiving apparatuses 140-1 and 140-2 (as shown in FIG. 1). Conventional image reconstruction algorithms (for example, the FBP) cannot be used for overlapping data in this partial overlapping region. This is because firstly, when the X-rays are absorbed, an exponential decay law is followed, and the overlapping projection data may be regarded as a sum of a plurality of exponential functions, and cannot be expanded "in a non-destructive manner" to a linear function with a limited length; and secondly, if the object to be inspected is discretized, the overlapping projection data makes the imaging system underdetermined, which results in failure in acquisition of a correct solution. In this regard, certain processing, such as the compressive sensing technique described above, is required to be used. Under conditions that data sparsity is satisfied and random sampling is implemented, image quality may be recovered using a sampling frequency much less than an Nyquist sampling frequency. Since the original image is sparse, the projection data may be expressed as:

$$p = (p_{1,1}, p_{2,1}, \ldots, p_{N_b,1}, \ldots, p_{1,N_r}, \ldots, p_{N_b,N_r})^T =$$

-continued $$\exp(-M_1 f) + \exp(-M_2 f) = \begin{bmatrix} \exp(-M_{1,1,1}f) \\ \exp(-M_{1,2,1}f) \\ \vdots \\ \exp(-M_{1,N_b,1}f) \\ \exp(-M_{1,1,2}f) \\ \vdots \\ \exp(-M_{1,N_b,2}f) \\ \vdots \\ \exp(-M_{1,1,N_r}f) \\ \vdots \\ \exp(-M_{1,N_b,N_r}f) \end{bmatrix} + \begin{bmatrix} \exp(-M_{2,1,1}f) \\ \exp(-M_{2,2,1}f) \\ \vdots \\ \exp(-M_{2,N_b,1}f) \\ \exp(-M_{2,1,2}f) \\ \vdots \\ \exp(-M_{2,N_b,2}f) \\ \vdots \\ \exp(-M_{2,1,N_r}f) \\ \vdots \\ \exp(-M_{2,N_b,N_r}f) \end{bmatrix}$$

where $N_b$ and $N_r$ are a number of detector crystals in the overlapping region and a projection angle of scanning in a circle, respectively; f is a two-dimensional image matrix, vector $M_{1,2}$ is a system matrix corresponding to a first or second X-ray source, and element $M_{l,m,r}$ (l=1,2; m=1, 2, …, $N_b$; r=1, 2, …, $N_r$) indicates a condition where rays which are emitted by an $l^{th}$ X-ray source and received by an $m^{th}$ detector at an $r^{th}$ projection angle interact with the object to be inspected, and generally refers to a length of a line of intersection between a corresponding pixel and the X-rays.

For a sparse image, the image to be reconstructed may firstly be converted into a gradient image, and then an $l_1$ mode of the gradient image is minimized. In this way, the image reconstruction process is transformed into a nonlinear optimization problem under constraint conditions, which may be solved by the iterative reconstruction algorithm, the gradient descent method or the convex set mapping method etc.

Figure 2:
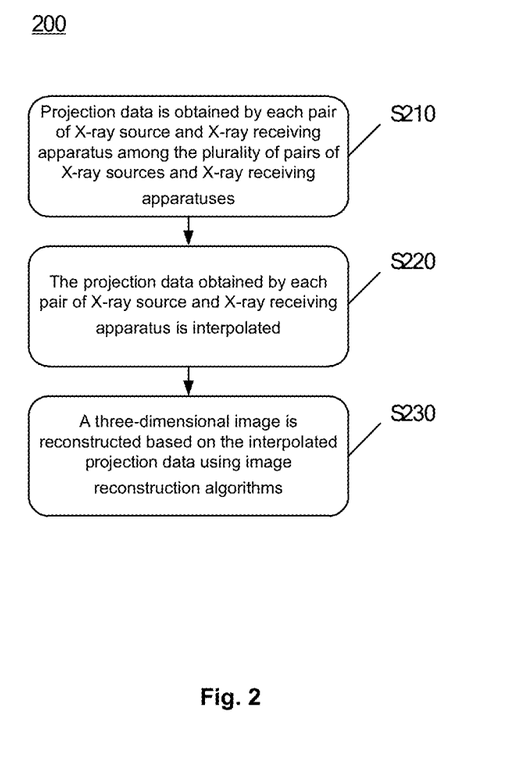
FIG. 2 illustrates a flowchart of a three-dimensional image reconstruction method according to an embodiment of the present disclosure.

FIG. 2 illustrates a flowchart of a method 200 for reconstructing a three-dimensional image from projection data obtained by a CT device according to an embodiment of the present disclosure. The CT device is not limited to the spiral CT device described in the embodiments of the present disclosure (as described above with reference to FIG. 1) as long as the CT device comprises a plurality of pairs of X-ray sources and X-ray receiving apparatuses. Hereinafter, for the convenience of description, when the method 200 is described in detail, the spiral CT device shown in FIG. 1 will be taken as an example.

Specifically, the method 200 starts at step S210, in which corresponding projection data is obtained by each pair of X-ray source and X-ray receiving apparatus among the plurality of pairs of X-ray sources and X-ray receiving apparatuses. Then, in step S220, the projection data obtained by each pair of X-ray source and X-ray receiving apparatus is interpolated. Finally, in step S230, a three-dimensional image is reconstructed based on the interpolated projection data using image reconstruction algorithms. Here, in step S230, for two pairs of X-ray sources and X-ray receiving apparatuses having an overlapped projection portion, an image reconstruction algorithm for data corresponding to the overlapped projection portion in the interpolated projection data obtained using the two pairs of X-ray sources and X-ray receiving apparatuses is different from an image reconstruction algorithm for data corresponding to remaining portions except for the overlapped projection portion in the interpolated projection data.

In step S210, corresponding projection data is obtained by each pair of X-ray source and X-ray receiving apparatus among the plurality of pairs of X-ray sources and X-ray receiving apparatuses. By taking the spiral CT structure 100 shown in FIG. 1 as an example, the X-ray sources 130-1 and 130-2 emit X-rays respectively, and the X-ray receiving apparatuses 140-1 and 140-2 receive the X-rays passing through the object to be inspected respectively, to obtain corresponding projection data respectively. Preferably, as in the case shown in FIG. 1, the two X-ray sources 130-1 and 130-2 have a coverage including the entire inspection space (this is true not only in a dimension corresponding to the paper sheets, but also in various slices distributed in a direction perpendicular to the paper sheets). Thereby, the reproduction of the three-dimensional image of the object to be inspected may be realized using data obtained using the X-ray sources 130-1 and 130-2 and the X-ray receiving apparatuses 140-1 and 140-2.

In step S220, the projection data obtained using each pair of X-ray source and X-ray receiving apparatus is interpolated. In one embodiment, the interpolation step is implemented using linear interpolation. Still By taking the spiral CT device shown in FIG. 1 as an example, since projection data in a slice depending on any of the scanning axes is incomplete, it is necessary to fill blank regions between existing data using the existing data through interpolation to avoid volume artifacts from occurring during reconstruction. In the above description, the exemplary interpolation method has been described in the description of FIG. 1, and details thereof will not be described herein again.

The projection data enriched by interpolation will be used for reconstruction in a next step.

In step S230, a three-dimensional image is reconstructed based on the interpolated projection data using image reconstruction algorithms. Here, the image reconstruction algorithms may be conventional image reconstruction algorithms, for example, the FBP. However, it is necessary to consider that the projection of two pairs of adjacent X-ray sources and X-ray receiving apparatuses is likely to overlap, and the conventional image reconstruction algorithms are no longer applicable for the overlapping region, that is, an algorithm (for example, the compressive sensing technique) different from the conventional image reconstruction algorithms is required to be used for the overlapping region. The exemplary algorithm for the overlapping region has been described above with respect to FIG. 1 and will not be described again here.

It should be understood that the method 200 may further comprise other conventional steps included in conventional three-dimensional image reconstruction methods, such as image noise reduction and smoothing, image correction, artifact region reconstruction, etc.

Figure 3:
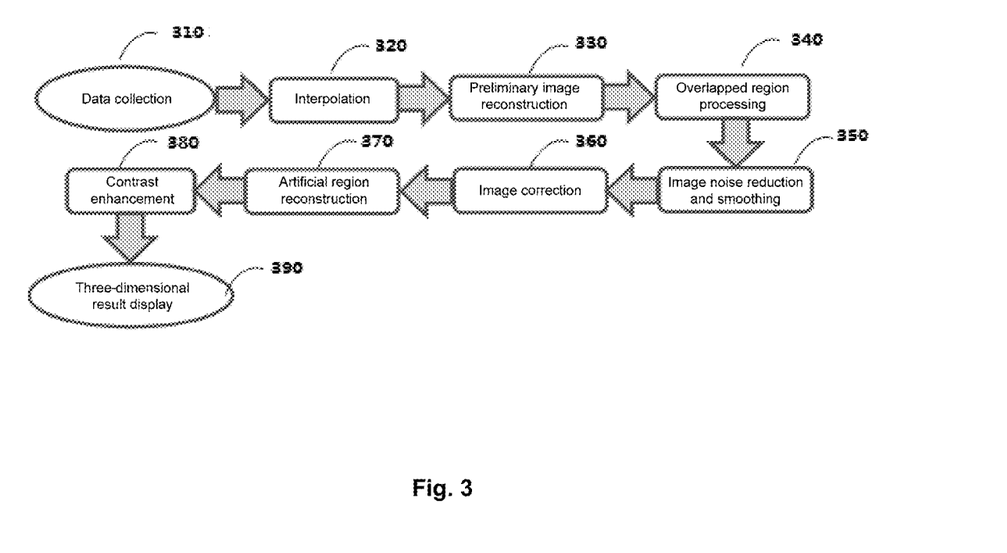
FIG. 3 illustrates an exemplary flowchart of a three-dimensional image reconstruction method implemented based on the spiral CT device shown in FIG. 1.

For example, FIG. 3 illustrates a specific exemplary flowchart of a three-dimensional image reconstruction method 300 implemented based on the spiral CT device illustrated in FIG. 1. Of course, it should be understood that various steps in FIG. 3 and an order of the steps are merely exemplary, and in other embodiments, other processing steps may be added or existing processing steps may be deleted, and the steps in FIG. 3 may further be exchanged.

The exemplary three-dimensional image reconstruction flow illustrated in FIG. 3 starts at data collection in step 310 and performs preliminary image reconstruction 330 through the interpolation 320 as described above. Next, the overlapping region processing step 340 is performed as described above. It should be illustrated that although the preliminary reconstruction 330 and the overlapping region processing 340 are illustrated here as two separate steps, they may also be implemented as a single step, i.e., different processing is implemented for different portions (for example, like step S230 of method 200 in FIG. 2).

Then, the reconstruction flow further proceeds to image noise reduction and smoothing processing in step 350 to improve a signal to noise ratio.

In step 360, image correction is performed. The image correction comprises processes such as geometric correction, scatter correction, beam correction, detector gain correction, and metal artifact correction etc. In addition to the correction methods commonly used in X-ray inspection systems, the metal artifact correction is not negligible in inspection of containers. The most critical step in the metal artifact correction is to segment out a metal artifact region, that is, to determine a boundary of the metal artifact region, using the threshold method, clustering method, edge detection method, average method or region growth method etc.

In step 370, the metal artifact region is reconstructed. Here, forward projection of the segmented region is performed to determine a position of a metal track in projection. Interpolation, for example, commonly-used linear interpolation, cubic spline interpolation, or fourth-order polynomial interpolation etc., is then performed to avoid, for example, striped artifacts, comet-like artifacts, etc.

In step 380, a contrast enhancement process is performed on the preliminarily reconstructed image.

Finally, in step 390, a three-dimensional result is displayed in a form of a three-dimensional image or a two-dimensional cross-sectional view at a specific position etc.

A typical exemplary embodiment of inspection using the spiral CT device described in the present disclosure is given below:

1. Firstly, an inspection station is brought down to a certain height, an object to be inspected is placed on the inspection station, and then the inspection station is raised to a height for measurement, and is translated to a measurement region at a constant speed.

2. X-ray accelerators are used as ray sources to provide high-energy X-ray beams. After the accelerators are stabilized, X-rays are emitted by the accelerators at a certain frequency and are received by corresponding detectors. The accelerators and corresponding auxiliary devices are mounted on a slip ring or bracket and rotate synchronously with the detector apparatuses. In order to reduce a size of the system, multiple rows of accelerators which are closely disposed are used to increase a coverage space of the ray beams. In order to ensure that the system collects a sufficient amount of data and the inspection system is simplified to reduce a cost thereof, the accelerators should have a high beam emission frequency.

3. The detectors receive the X-ray beams passing through a container, and after a signal of the X-ray beams is converted, data of the signal is transmitted to a control center and data processing module. In the present disclosure, a structure of multiple rows of detectors is used, and image data in multiple slices may be obtained at the same time through exposure of the X-ray accelerators at a time, which may increase a detection area, reduce the collection time, and improve the inspection efficiency. Each of the X-ray accelerators corresponds to a group of multiple rows of detectors, and rotates around a rotational center at a constant speed on the slip ring. Numbers and sizes of detectors in various groups may be the same or different, and correspond to their respective data collection channels.

4. The control center controls operations of the X-ray emitting apparatuses, the detector apparatuses, the slip ring system, the inspection station and the data processing module, coordinates the entire inspection process through mechanical control, electrical control and security interlock control etc., and transmits the projection data to the data processing center for imaging. This part may be implemented using a single PC with a high performance, or a workstation or a cluster of machines.

5. The data processing center processes the projection data collected by the detectors and reconstructs a three-dimensional image of the object. This process comprises data interpolation preprocessing (for example, 180-degree or 360-degree linear interpolation), preliminary reconstruction of spiral CT images (using, for example, the FBP algorithm, ART algorithm or FBP-OSEM combined algorithm etc.), multi-source overlapping region processing, image correction, metal region reconstruction, image enhancement, etc.

6. Finally, a three-dimensional reconstruction image of the object in an air box to be inspected is displayed on a display. Three-dimensional rapid non-destructive inspection of the object to be inspected may be realized, which greatly improves the inspection efficiency to meet the needs of the airport for rapid inspection of a large number of cargoes.

The foregoing detailed description has set forth various embodiments via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A spiral Computed Tomography (CT) device, comprising:
    an inspection station operable to carry an object to be inspected on a carrying surface thereof, wherein an inspection space is defined above the carrying surface, a normal direction for the carrying surface is a first direction, and the inspection station is operable to move along a second direction perpendicular to the first direction to cause the object to be inspected to pass through the inspection space;
    a rotational supporting apparatus disposed around the inspection space in a plane perpendicular to the second direction and operable to rotate around the inspection space;
    a plurality of X-ray sources located on the rotational supporting apparatus and configured to transmit fan-shaped X-ray beams to pass through the inspection space; the plurality of X-ray sources is further configured to emit fan-shaped X-ray beams such that the fan-shaped X-ray beams from each of the plurality of X-ray sources cover an angular portion of the inspection space, and the fan-shaped X-ray beams from the plurality of X-ray sources pass through the object and the inspection space and cover the entire inspection space; and
    a plurality of X-ray receiving apparatuses in one-to-one correspondence to the plurality of X-ray sources, the plurality of X-ray receiving apparatuses being located on the rotational supporting apparatus and opposing to the plurality of X-ray sources respectively, the plurality of X-ray receiving apparatuses being configured to collect the fan-shaped X-ray beams passing through the inspection space,
    wherein the plurality of X-ray sources and the plurality of X-ray receiving apparatuses are operable to rotate with the rotational supporting apparatus,
    wherein the plurality of X-ray sources are closely disposed, the plurality of X-ray receiving apparatuses each comprise a plurality of rows of detector crystals, and a beam emission frequency of the plurality of X-ray sources satisfies: a total number of beam emissions from the plurality of X-ray sources × a total number of the plurality of rows of detector crystals≥a number of pixels in a three-dimensional image during scanning, so that an amount of projection data is not lower than the number of pixels in the three-dimensional image.

2. The spiral Computed Tomography device according to claim 1, wherein the inspection station is further movable along the first direction.

3. The spiral Computed Tomography device according to claim 1, wherein the rotation supporting apparatus is a slip ring, the plurality of X-ray sources and the plurality of X-ray receiving apparatuses are disposed on a circumference of the slip ring, and a X-ray sources and a corresponding X-ray receiving apparatuses are disposed on opposite sides of the circumference with respect to a center of the circumference.

4. The spiral Computed Tomography device according to claim 1, wherein the rotational supporting apparatus is a bracket.

5. The spiral Computed Tomography device according to claim 1, wherein the plurality of X-ray sources are X-ray accelerators.

6. The spiral Computed Tomography device according to claim 1, further comprising: a processor connected to the plurality of X-ray receiving apparatuses and configured to process signals of the collected fan-shaped X-ray beams and reconstruct a three-dimensional image of the object to be inspected, wherein the processor is configured to reconstruct the three-dimensional image using a linear interpolation method.

7. A method for reconstructing a three-dimensional image from projection data obtained by the spiral Computed Tomography device according to claim 1, the method comprising:
    emitting from each of a plurality of X-ray sources fan-shaped X-ray beams such that the fan-shaped X-ray beams from each of the plurality of X-ray sources cover an angular portion of the inspection space, and the fan-shaped X-ray beams from the plurality of X-ray sources pass through an object and an inspection space, while the fan-shaped X-ray beams from the plurality of X-ray sources cover the entire inspection space;
    obtaining a plurality of projection data by detecting the fan-shaped X-ray beams emitted from the plurality of X-ray sources and passing through the object in the inspection space with a respective plurality of X-ray receiving apparatuses of the spiral Computed Tomography device, wherein coverages of two adjacent X-ray receiving apparatuses of the plurality of X-ray receiving apparatuses have an overlapped region;
    interpolating the plurality of projection data; and
    reconstructing a three-dimensional image of the object based on the interpolated plurality of projection data using image reconstruction algorithms,
    wherein in the step of reconstructing the three-dimensional image, for the two adjacent X-ray receiving apparatuses, an image reconstruction algorithm for data corresponding to the overlapped region in the interpolated plurality of projection data of each X-ray receiving apparatus is different from an image reconstruction algorithm for data corresponding to remaining regions in the interpolated plurality of projection data,
    wherein the plurality of X-ray sources are closely disposed.

8. The spiral Computed Tomography (CT) device of claim 1, wherein the plurality of X-ray sources are spaced apart from each other along a rotational path of travel by the X-ray sources.

9. The spiral Computed Tomography device according to claim 2, wherein the first direction is a vertical direction.

10. The spiral Computed Tomography device according to claim 3, wherein the center of the circumference of the slip ring coincides with a center of the inspection space in a detection state.

11. The spiral Computed Tomography device according to claim 6, wherein when coverages of two adjacent X-ray receiving apparatuses of the plurality of X-ray receiving apparatuses have an overlapped region, signals in the overlapping region is processed using a compressive sensing technique.

12. The method according to claim 7, wherein the interpolating step is implemented using a linear interpolation method.

13. The method according to claim 7, wherein the data corresponding to the overlapped region in the interpolated projection data for the two adjacent X-ray receiving apparatuses is processed using a compressive sensing technique.

14. The method of claim 7, further comprising rotating the plurality of X-ray sources along a rotational path around the inspection space, wherein emitting from each of the plurality of X-ray sources fan-shaped X-ray beams comprises emitting fan-shaped X-ray beams from each of the plurality of X-ray sources spaced apart from each other along the rotational path.

15. A spiral Computed Tomography (CT) device, comprising:
    an inspection station operable to carry an object to be inspected on a carrying surface thereof, wherein an inspection space is defined above the carrying surface, a normal direction for the carrying surface is a first direction, and the inspection station and the carrying surface are movable relative to each other along a second direction perpendicular to the first direction to cause the object to be inspected to pass through the inspection space;
    a rotational supporting apparatus disposed around the inspection space in a plane perpendicular to the second direction and operable to rotate around the inspection space;
    a plurality of X-ray sources located on the rotational supporting apparatus and configured to transmit X-rays to pass through the inspection space; and
    a plurality of X-ray receiving apparatuses located on the rotational supporting apparatus, each of the plurality of X-ray receiving apparatuses opposing to one of the plurality of X-ray sources respectively and being configured to receive the X-rays passing through the inspection space,
    wherein the plurality of X-ray sources and the plurality of X-ray receiving apparatuses are operable to rotate with the rotational supporting apparatus,
    wherein the plurality of X-ray sources are closely disposed and configured to emit fan-shaped X-ray beams passing through different respective portions of the inspection space, the plurality of X-ray receiving apparatuses each comprise a plurality of rows of detector crystals, and a beam emission frequency of the plurality of X-ray sources satisfies: a total number of beam emissions from the plurality of X-ray sources×a total number of the plurality of rows of detector crystals≥a number of pixels in a three-dimensional image during scanning, so that an amount of projection data is not lower than the number of pixels in the three-dimensional image.

16. The spiral Computed Tomography (CT) device of claim 15, wherein the rotational supporting apparatus is configured to rotate about a rotational axis, and wherein each of the plurality of X-ray sources is configured to emit fan-shaped X-ray beams with each having an angular span, at least one of the angular span is not centered at the rotational axis.

17. The spiral Computed Tomography (CT) device of claim 15, wherein the fan-shaped X-ray beams of the plurality of X-ray sources pass through the entire inspection space.

18. The spiral Computed Tomography (CT) device of claim 15, wherein the plurality of X-ray sources are spaced apart from each other along a rotational path of travel by the X-ray sources.

* * * * *